(12) United States Patent
Nakajima

(10) Patent No.: US 10,890,980 B2
(45) Date of Patent: Jan. 12, 2021

(54) OPERATING APPARATUS FOR ESTIMATING AN OPERATION INTENTION INTENDED BY A FACE DIRECTION

(71) Applicant: TOYOTA JIDOSHA KABUSHIKI KAISHA, Toyota (JP)

(72) Inventor: Kiyofumi Nakajima, Odawara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 94 days.

(21) Appl. No.: 16/157,814

(22) Filed: Oct. 11, 2018

(65) Prior Publication Data

US 2019/0155393 A1    May 23, 2019

(30) Foreign Application Priority Data

Nov. 20, 2017 (JP) .................................. 2017-222858

(51) Int. Cl.
*G06F 3/01* (2006.01)
*G06K 9/00* (2006.01)
*B60K 37/06* (2006.01)

(52) U.S. Cl.
CPC .............. *G06F 3/017* (2013.01); *B60K 37/06* (2013.01); *G06F 3/012* (2013.01); *G06F 3/013* (2013.01); *G06K 9/00228* (2013.01); *G06K 9/00268* (2013.01); *G06K 9/00335* (2013.01); *G06K 9/00597* (2013.01); *G06K 9/00845* (2013.01)

(58) Field of Classification Search
CPC .......... G06F 3/017; G06F 3/013; G06F 3/012; G06K 9/00845; G06K 9/00335; G06K 9/00268; G06K 9/00597; G06K 9/00228; B60K 37/06; B60K 2370/149; B60K 2370/21

See application file for complete search history.

(56) References Cited

U.S. PATENT DOCUMENTS

| | | | |
|---|---|---|---|
| 2007/0071321 A1* | 3/2007 | Ota ..................... | G06K 9/00335 382/181 |
| 2007/0139512 A1* | 6/2007 | Hada .................... | H04M 11/085 348/14.01 |
| 2008/0158357 A1* | 7/2008 | Connell ................. | H04N 7/183 348/148 |
| 2009/0167516 A1 | 7/2009 | Kogawara et al. | |
| 2010/0049375 A1* | 2/2010 | Tanimoto .................. | B60T 7/12 701/1 |
| 2014/0129082 A1* | 5/2014 | Takahashi ................. | B60R 1/12 701/36 |

(Continued)

FOREIGN PATENT DOCUMENTS

| JP | H08-322796 A | 12/1996 |
|---|---|---|
| JP | 2000-163196 A | 6/2000 |

(Continued)

*Primary Examiner* — Ming Y Hon
(74) *Attorney, Agent, or Firm* — Oliff PLC

(57) ABSTRACT

An operating apparatus is provided with: a line-of-sight detector configured to detect a line of sight of an occupant of a vehicle; a face direction detector configured to detect a face direction of the occupant; and an estimator configured to estimate an operation intention intended by the face direction on the basis of the detected face direction, on condition that a change in the detected face direction is greater than a change in the detected line of sight by an amount that is greater than or equal to a predetermined amount.

8 Claims, 6 Drawing Sheets

(56) References Cited

U.S. PATENT DOCUMENTS

| | | | |
|---|---|---|---|
| 2014/0191948 A1* | 7/2014 | Kim | G06F 3/012 345/156 |
| 2015/0116206 A1* | 4/2015 | Irie | G06F 3/012 345/156 |
| 2016/0089980 A1* | 3/2016 | Kurahashi | G06F 3/013 345/156 |
| 2017/0102774 A1 | 4/2017 | Naruse | |
| 2017/0316274 A1* | 11/2017 | Noridomi | G06T 7/246 |
| 2019/0236343 A1* | 8/2019 | Konishi | G06F 3/017 |

FOREIGN PATENT DOCUMENTS

| | | |
|---|---|---|
| JP | 2009-157736 A | 7/2009 |
| JP | 2011-209928 A | 10/2011 |
| JP | 2014-126997 A | 7/2014 |
| JP | 2014-149640 A | 8/2014 |
| JP | 2015-087824 A | 5/2015 |
| JP | 2015-191310 A | 11/2015 |
| JP | 2016-115118 A | 6/2016 |
| WO | 2007/105792 A1 | 9/2007 |

* cited by examiner

Horizontal direction

Vertical direction

FIG. 4

| Horizontal direction determination | Vertical direction determination | Rotation | Target device | Operation |
|---|---|---|---|---|
| Right(+) | Upward(+) | None | Air conditioner | Increase temperature |
| Right(+) | Not determined | None | Navigator | Cursor operation (to right) |
| Right(+) | Downward(−) | None | Air conditioner | Reduce temperature |
| Not determined | Upward(+) | None | Air conditioner | Wind direction upward |
| Not determined | Downward(−) | None | Air conditioner | Wind direction downward |
| Left(−) | Upward(+) | None | Audio | Increase volume of sound |
| Left(−) | Not determined | None | Navigator | Cursor operation (to left) |
| Left(−) | Downward(−) | None | Audio | Reduce volume of sound |
| Right(+) | ■■■■ | Right | △△△ | ●●●● |
| Left(−) | ■■■■ | Left | △△△ | × × × × |

US 10,890,980 B2

OPERATING APPARATUS FOR ESTIMATING AN OPERATION INTENTION INTENDED BY A FACE DIRECTION

CROSS-REFERENCE TO RELATED APPLICATIONS

This application is based upon and claims the benefit of priority of the prior Japanese Patent Application No. 2017-222858, filed on Nov. 20, 2017, the entire contents of which are incorporated herein by reference.

BACKGROUND

1. Technical Field

Embodiments of the present disclosure relate to an operating apparatus.

2. Description of the Related Art

For this type of apparatus, for example, there is proposed an apparatus configured to select an option from an operation menu including a plurality of layers, by combining line-of-sight movement of a driver of a vehicle and gesture made by the driver's hand (refer to Japanese Patent Application Laid Open No. 2015-191310 (Patent Literature 1)). There is also proposed an apparatus configured to perform a predetermined screen operation when an operator gazes at a screen and if the operator's face direction or face movement satisfies a predetermined condition (refer to Japanese Patent Application Laid Open No. 2015-087824 (Patent Literature 2)). There is also proposed an apparatus configured to determine an operation target device on the basis of positions of eyes of an occupant detected from an image(s) and a position of a hand of the occupant and configured to control the determined operation target device to perform a predetermined operation corresponding to a gesture operation of the occupant detected from the image(s) (refer to Japanese Patent Application Laid Open No. 2014-149640 (Patent Literature 3)). There is also proposed an apparatus configured to calculate an interval of positions of left and right eyes in a vertical direction on the basis of position coordinates of the left and right eyes from a driver's face image(s), thereby to detect the driver's behavior of leaning the face direction in a lateral direction, and configured to perform an operation corresponding to an object when the behavior is detected and if the driver gazes at the object on a display apparatus (refer to Japanese Patent Application Laid Open No. 2014-126997 (Patent Literature 4)). There is also proposed an apparatus configured to detect a user's eye movement and move a cursor displayed on a display, configured to the user's face movement, and configured to perform a corresponding operation command or a selection command (refer to Japanese Patent Application Laid Open No. 2011-209928 (Patent Literature 5)).

For a method of detecting a line-of-sight direction, there is proposed a technology/technique in which the line-of-sight direction is detected by comparing position information in each of a horizontal direction and a vertical direction about black eyes in a face image(s) with a standard pattern (refer to Japanese Patent Application Laid Open No. H08-322796 (Patent Literature 6)). There is also proposed an apparatus configured to detect a line-of-sight direction of a driver on the basis of the driver's face image(s) and configured to detect the driver's action of looking aside in the vertical direction and the horizontal direction (refer to Japanese Patent Application Laid Open No. 2009-157736 (Patent Literature 7)). There is also proposed an apparatus configured to specify a face direction by verifying a driver's face image(s) and a three-dimensional face shape and configured to determine that the driver looks down if a downward change in the face direction is synchronized with a downward change in the line-of-sight direction of the driver (refer to Japanese Patent Application Laid Open No. 2016-115118 (Patent Literature 8)).

By the way, a driver needs to look at various points in order to safely drive a vehicle, and has a duty or a responsibility of appropriately operating a steering wheel or the like. During driving, a line of sight of the driver moves relatively frequently, and there is thus a possibility of an erroneous operation in the technologies/techniques described in the aforementioned Patent Literatures 2 to 5. Moreover, in the technologies/techniques described in the aforementioned Patent Literatures 2 and 4, the driver needs to gaze at a particular position on the screen, which possibly interferes with the driving. In the technologies/techniques described in the aforementioned Patent Literatures 1 and 3, the driver needs to perform the gesture by using the hand, and there is a room for improvement from a viewpoint of a safe driving duty imposed on the driver.

SUMMARY

In view of the aforementioned problems, it is therefore an object of embodiments of the present disclosure to provide an operating apparatus configured to input an operation without using a hand while preventing an erroneous operation.

The above object of embodiments of the present disclosure can be achieved by an operating apparatus provided with: a line-of-sight detector configured to detect a line of sight of an occupant of a vehicle; a face direction detector configured to detect a face direction of the occupant; and an estimator configured to estimate an operation intention intended by the face direction on the basis of the detected face direction, on condition that a change in the detected face direction is greater than a change in the detected line of sight by an amount that is greater than or equal to a predetermined amount.

The above object of embodiments of the present disclosure can be achieved by an operating apparatus provided with: a line-of-sight detector configured to detect a line of sight of an occupant of a vehicle; a face direction detector configured to detect a face direction of the occupant; and an estimator configured to estimate an operation intention intended by the face direction on the basis of the detected face direction, on condition that a change speed of the face direction when the face direction changes in one direction, which is based on the detected face direction, is greater than a predetermined speed, and on condition that a change in the detected line of sight is less than a predetermined change amount.

BRIEF DESCRIPTION OF THE DRAWINGS

FIG. 4 is a diagram illustrating an example of a relation between the face direction and an operation type;

DETAILED DESCRIPTION OF THE EMBODIMENTS

An operating apparatus according to an embodiment will be explained with reference to FIG. 1 to FIG. 4. In the embodiment below, an example of the operating apparatus is an operation input apparatus.

(Configuration)

Figure 1:
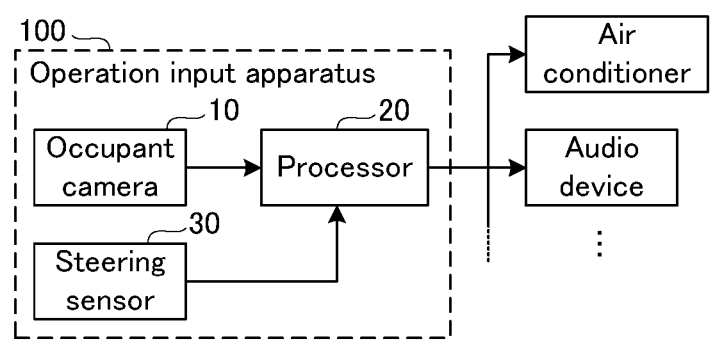
FIG. 1 is a block diagram illustrating a configuration of an operation input apparatus according to an embodiment.

A configuration of the operation input apparatus according to the embodiment will be explained with reference to FIG. 1. FIG. 1 is a block diagram illustrating the configuration of the operation input apparatus according to the embodiment. In FIG. 1, an operation input apparatus 100 is mounted on a vehicle 1. The operation input apparatus 100 is provided with an occupant camera 10, a processor 20, and a steering sensor 30.

The occupant camera 10 is a camera for imaging or photographing a driver of the vehicle 1. The steering sensor 30 is configured to detect a steering angle of a not-illustrated steering wheel of the vehicle 1. The steering sensor 30 may not be provided only for the operation input apparatus 100, and may be shared by another apparatus.

The processor 20 is configured to detect a face direction operation of the driver, i.e., an operation of changing a face direction of the driver that is intended to operate a predetermined device, from a images of the driver imaged by the occupant camera 10, and configured to transmit an operation instruction corresponding to the detected face direction operation to the predetermined device, e.g., an air conditioner, an audio device, etc., thereby operating the predetermined device. The driver can thus operate the predetermined device by the face direction operation.

(Operation of Processor)

Figure 2:
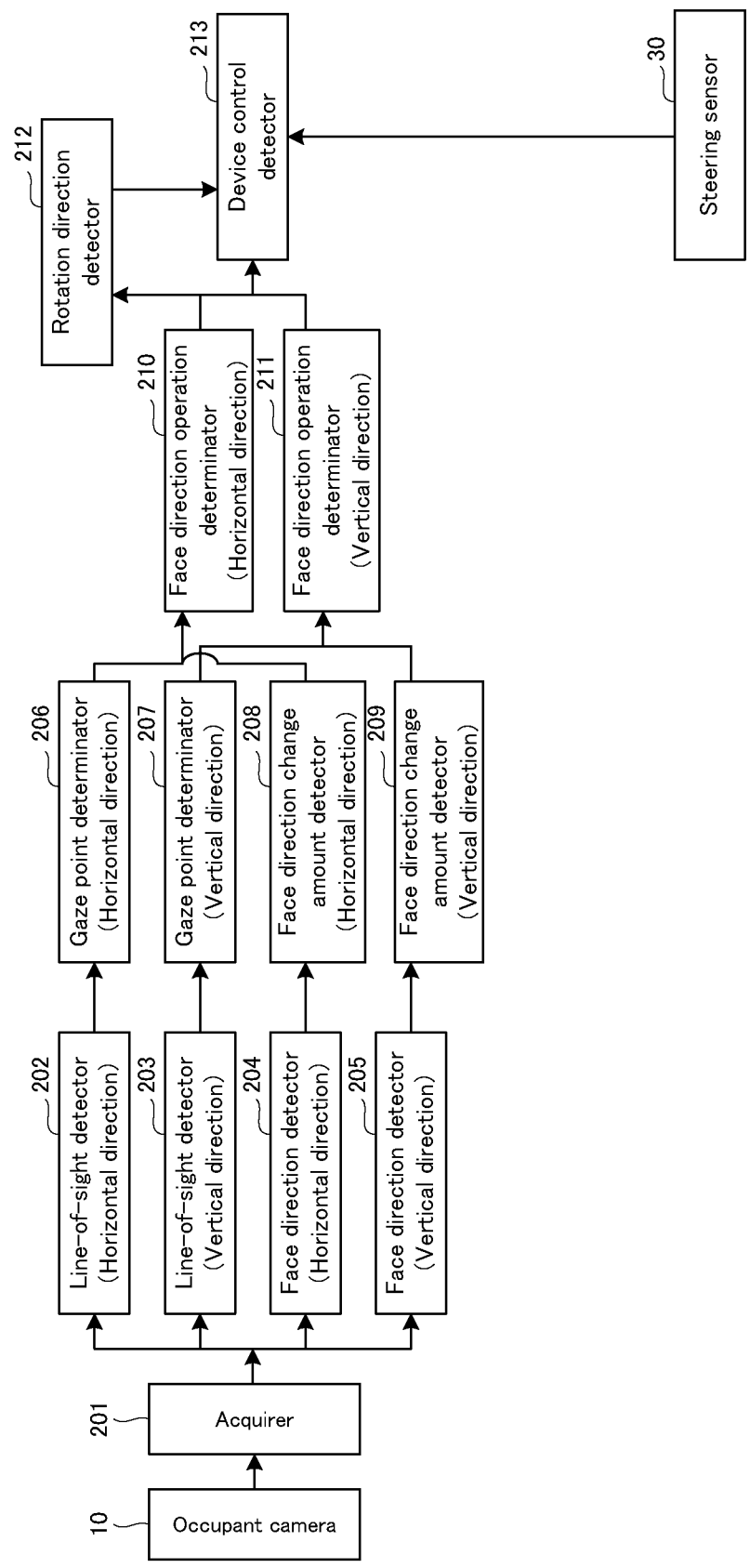
FIG. 2 is a block diagram illustrating a configuration of a processor according to the embodiment.

The processor 20 will be explained with reference to FIG. 2. FIG. 2 is a block diagram illustrating a configuration of the processor according to the embodiment.

In FIG. 2, the processor 20 is provided with an acquirer 201, line-of-sight direction detectors 202 and 203, face direction detectors 204 and 205, gaze point determinators 206 and 207, face direction change amount detectors 208 and 209, face direction operation determinators 210 and 211, a rotation direction detector 212, and a device control detector 213, as processing blocks logically realized or processing circuits physically realized inside the processor 20, in order to realize the operation of the predetermined device by the face direction operation.

(1) Detection of Line of Sight and Face Direction

The acquirer 201 is configured to obtain a video imaged by the occupant camera 10. Each of the line-of-sight direction detectors 202 and 203 is configured to perform a line-of-sight detection process on each of frame images that constitute the video obtained by the acquirer 201. The line-of-sight direction detectors 202 is then configured to detect a line-of-sight direction of the driver in a horizontal direction, e.g., to detect at which position a line of sight of the driver is directed on an axis extending in a lateral direction of the driver, on the basis of a result of the line-of-sight detection process. In the same manner, the line-of-sight direction detectors 203 is configured to detect the line-of-sight direction of the driver in a vertical direction, e.g., to detect at which position the line of sight of the driver is directed on an axis extending in the vertical direction of the driver, on the basis of the result of the line-of-sight detection process.

Each of the face direction detectors 204 and 205 is configured to perform a face detection process on each of the frame images that constitute the video obtained by the acquirer 201. The face direction detector 204 is then configured to detect a face direction in the horizontal direction, e.g., to detect at which position the driver's face is directed on the axis extending in the lateral direction of the driver, on the basis of a result of the face detection process. In the same manner, the face direction detector 205 is configured to detect the face direction in the vertical direction, e.g., to detect at which position the driver's face is directed on the axis extending in the vertical direction of the driver, on the basis of the result of the face detection process.

The gaze point determinator 206 is configured to determine a gaze direction of the driver in the horizontal direction, on the basis of a detection result, for example, for 6 frame images, obtained by the line-of-sight direction detector 202. In the same manner, the gaze point determinator 207 is configured to determine the gaze direction of the driver in the vertical direction, on the basis of a detection result, for example, for 6 frame images, obtained by the line-of-sight direction detector 203. Here, the "gaze direction of the driver in the horizontal direction" may be expressed, for example, as an angle made by a reference direction and a projection vector when a vector indicating the gaze direction is projected on a plane orthogonal to a straight line extending in the vertical direction (i.e., a horizontal plane). The "gaze direction of the driver in the vertical direction" may be expressed, for example, as the angle made by the reference direction and the projection vector when the vector indicating the gaze direction is projected on a plane orthogonal to a straight line extending in the lateral direction of the driver.

The face direction change amount detector 208 is configured to detect a change amount of the face direction in the horizontal direction, which is herein a change amount of the face direction in the horizontal direction for a time length in which 6 frame images are photographed or imaged, on the basis of a detection result, for example, for the 6 frame images, obtained by the face direction detector 204. In the same manner, the face direction change amount detector 209 is configured to detect a change amount of the face direction in the vertical direction, which is herein a change amount of the face direction in the vertical direction for the time length in which 6 frame images are photographed or imaged, on the basis of the detection result, for example, for the 6 frame images, obtained by the face direction detector 204.

(2) Face Direction Operation Determination

The face direction operation determinator 210 is configured to determine whether or not there is a face direction operation that is intended for an operation input, on the basis of a determination result obtained by the gaze point determinator 206 and a detection result obtained by the face direction change amount detector 208. In the same manner, the face direction operation determinator 211 is configured to determine whether or not there is a face direction operation that is intended for the operation input, on the basis of a determination result obtained by the gaze point determinator 207 and a detection result obtained by the face direction change amount detector 209.

Figure 3A:
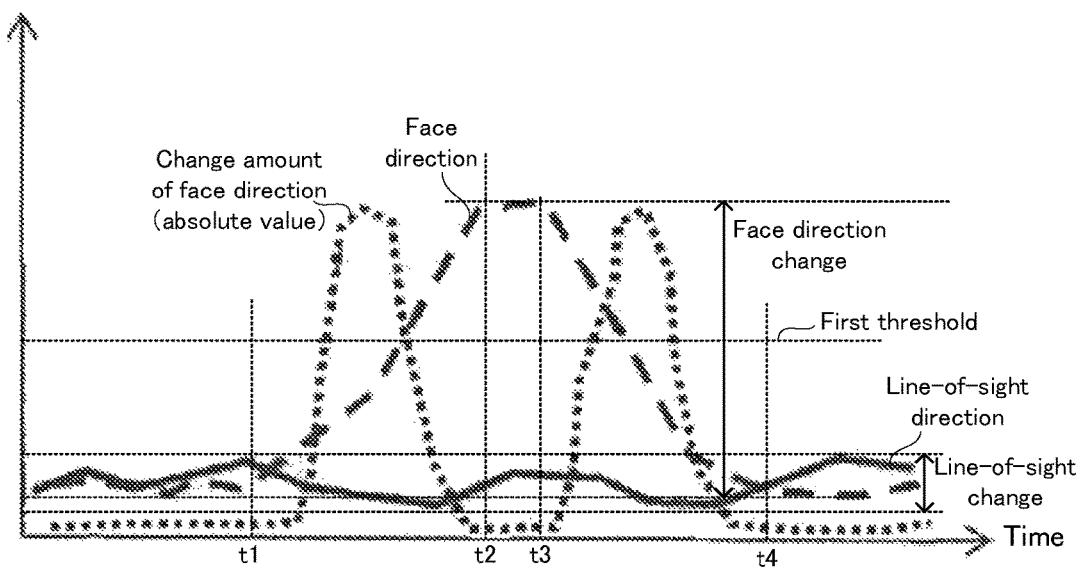
FIG. 3A is a diagram illustrating an example of a time change in a face direction, a line-of-sight direction, and a change amount of the face direction, wherein the face direction changes horizontally.
Figure 3B:
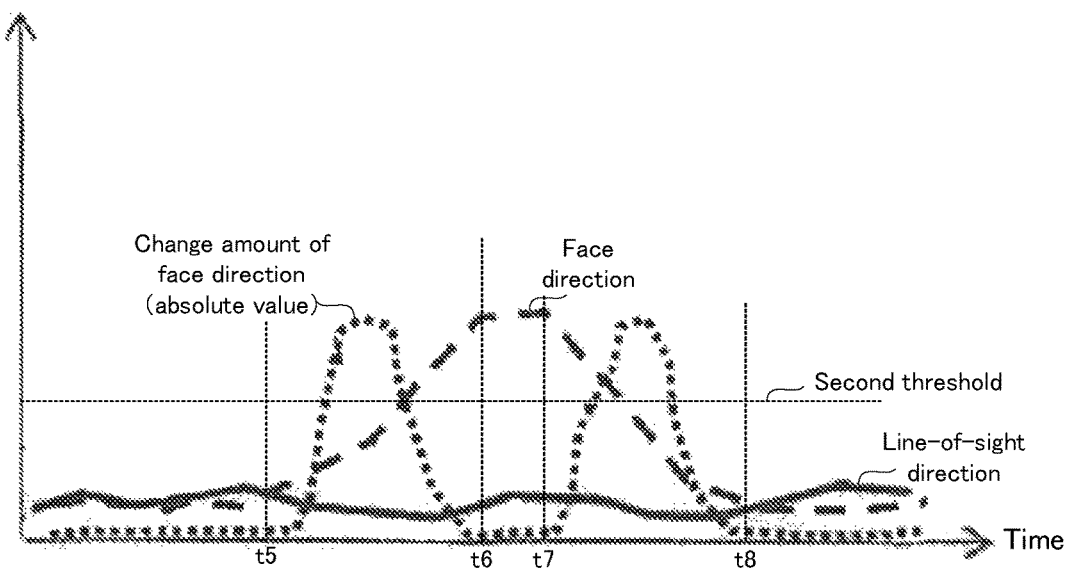
FIG. 3B is a diagram illustrating an example of a time change in the face direction, the line-of-sight direction, and the change amount of the face direction, wherein the face direction changes vertically.

Now, the determination on each of the face direction operation determinators 210 and 211 will be specifically explained with reference to FIG. 3A and FIG. 3B. FIG. 3A and FIG. 3B are diagrams illustrating an example of a time change in the face direction, the line-of-sight direction, and a change amount of the face direction.

Firstly, an explanation will be given to a difference between when the driver performs the face direction operation that is intended for the operation input and when the face direction changes due to the driver's action of looking aside or the like.

When the driver performs the face direction operation that is intended for the operation input, the line of sight of the driver is directed at a point to look at during driving, whereas the driver's face is directed in a different direction from the point to look at. In other words, when the driver performs the face direction operation that is intended for the operation input, there is a relatively large difference between the direction of the line of sight of the driver and the face direction in a relatively short period in which the face direction operation is performed. At the same time, there is a relatively small change in the line-of-sight direction of the driver, whereas there is a relatively large change in the face direction.

On the other hand, when the face direction changes due to the driver's action of looking aside or the like, there is a relatively small difference between the direction of the line of sight of the driver and the face direction. In other words, when the face direction changes due to the driver's action of looking aside or the like, if there is a relatively small change in the line of sight of the driver, there is a relatively small change in the face direction, and if there is a relatively large change in the line-of-sight direction, there is a relatively large change in the face direction.

The face direction operation determinator 210 is configured to compare a change in the line of sight in the horizontal direction based on the determination result obtained by the gaze point determinator 206 (i.e., a change in the line-of-sight direction in the horizontal direction) with a change in the face direction in the horizontal direction based on the detection result obtained by the face direction change amount detector 208 (which may be obtained, for example, by integrating a change amount of the face direction in the horizontal direction per unit time (which is herein the time length in which 6 frame images are photographed or imaged)), thereby determining whether or not the change in the face direction in the horizontal direction is greater than the change in the line of sight in the horizontal direction by an amount that is greater than or equal to a first predetermined amount. The face direction operation determinator 210 is further configured to determine whether or not an absolute value of the change amount of the face direction in the horizontal direction per unit time, which is based on the detection result obtained by the face direction change amount detector 208, exceeds a first threshold value twice within a first predetermined period.

If it is determined that the change in the face direction in the horizontal direction (refer to "Face direction change" in FIG. 3A) is greater than the change in the line of sight in the horizontal direction (refer to "Line-of-sight change" in FIG. 3A) by the amount that is greater than or equal to the first predetermined amount, and if it is determined that the absolute value of the change amount of the face direction in the horizontal direction per unit time exceeds the first threshold value twice within the first predetermined period, then, the face direction operation determinator 210 may determine that the face direction operation in the horizontal direction is performed. On the other hand, if it is determined that the change in the face direction in the horizontal direction is not greater than the change in the line of sight in the horizontal direction by the amount that is greater than or equal to the first predetermined amount, or if it is determined that the absolute value of the change amount of the face direction in the horizontal direction per unit time does not exceed the first threshold value twice within the first predetermined period, then, the face direction operation determinator 210 may determine that there is no face direction operation in the horizontal direction.

Now, considering a "rightward change in the face direction" as an example of the face direction operation, the driver changes the face direction to the right as the face direction operation, and then always returns the face direction, i.e., changes the face direction to the left. Thus, when the face direction operation that is the "rightward change in the face direction" is performed, it is indicated by the detection result obtained by the face direction change amount detector 208 that the absolute value of the change amount of the face direction in the horizontal direction per unit time becomes relatively large twice, i.e., when the face direction is changed to the right and when the face direction is returned.

Specifically, for example, as illustrated in FIG. 3A, when the face direction (refer to a dashed line in FIG. 3A) changes to the right (refer to time points t1 to t2), a peak of the absolute value of the change amount of the face direction (refer to a dotted line in FIG. 3A) appears. Moreover, a peak of the absolute value of the change amount of the face direction also appears when the face direction changes to the left (refer to time points t3 to t4). A positive direction of a vertical axis in FIG. 3A is set to be "rightward".

Thus, the face direction operation determinator 210 is configured to determine whether or not the absolute value of the change amount of the face direction in the horizontal direction per unit time exceeds the first threshold value "twice". The "first predetermined period" may be a period for distinguishing between the face direction operation and an operation of changing the face direction other than the face direction operation, and may be typically set as a fixed value in advance. The first predetermined period may vary, for example, in accordance with the age of the driver, or in accordance with a learning result of the driver's behavior associated with the face direction operation, or the like.

The "first predetermined amount" may be one of values for determining whether or not there is the face direction operation in the horizontal direction, and may be set as a fixed value in advance or as a variable value corresponding to some physical quantity or parameter. The "first predetermined amount" may be set as a value that allows the face direction operation and the change in the face direction caused by the driver's action of looking aside or the like to be appropriately distinguished, for example, on the basis of a distribution of a plurality of measurement points that indicate a difference between the change in the face direction in the horizontal direction and the change in the line of sight in the horizontal direction when the face direction operation is intended, and a distribution of a plurality of measurement points that indicate a difference between the change in the face direction in the horizontal direction and the change in the line of sight in the horizontal direction when the face direction changes due to the driver's action of looking aside or the like, wherein the distributions are obtained by experiments, experiences, or simulations.

The "first predetermined threshold value" may be one of values for determining whether or not there is the face direction operation in the horizontal direction, and may be set as a fixed value in advance or as a variable value corresponding to some physical quantity or parameter. The "first predetermined threshold value" may be set as a lower limit value of a distribution range, for example, on the basis of a distribution of a plurality of measurement points that indicate the change amount of the face direction in the horizontal direction per unit time when the face direction operation is intended, wherein the distribution is obtained by experiments, experiences, or simulations.

The face direction operation determinator 211 is configured to compare a change in the line of sight in the vertical direction based on the determination result obtained by the gaze point determinator 207 (i.e., a change in the line-of-sight direction in the vertical direction) with a change in the face direction in the vertical direction based on the detection result obtained by the face direction change amount detector 209 (which may be obtained, for example, by integrating a change amount of the face direction in the horizontal direction per unit time (which is herein the time length in which 6 frame images are photographed or imaged)), thereby determining whether or not the change in the face direction in the vertical direction is greater than the change in the line of sight in the vertical direction by an amount that is greater than or equal to a second predetermined amount. The face direction operation determinator 211 is further configured to determine whether or not an absolute value of the change amount of the face direction in the vertical direction per unit time, which is based on the detection result obtained by the face direction change amount detector 209, exceeds a second threshold value twice within the first predetermined period.

If it is determined that the change in the face direction in the vertical direction is greater than the change in the line of sight in the vertical direction by the amount that is greater than or equal to the second predetermined amount, and if it is determined that the absolute value of the change amount of the face direction in the vertical direction per unit time exceeds the second threshold value twice within the first predetermined period, then, the face direction operation determinator 211 may determine that the face direction operation in the vertical direction is performed. On the other hand, if it is determined that the change in the face direction in the vertical direction is not greater than the change in the line of sight in the vertical direction by the amount that is greater than or equal to the second predetermined amount, or if it is determined that the absolute value of the change amount of the face direction in the vertical direction per unit time does not exceed the second threshold value twice within the first predetermined period, then, the face direction operation determinator 211 may determine that there is no face direction operation in the vertical direction.

For example, as illustrated in FIG. 3B, when the face direction (refer to a dashed line in FIG. 3B) changes upward (refer to time points t5 to t6), a peak of the absolute value of the change amount of the face direction (refer to a dotted line in FIG. 3B) appears. Moreover, a peak of the absolute value of the change amount of the face direction also appears when the face direction changes downward, i.e., when the face direction is returned (refer to time points t7 to t8). A positive direction of a vertical axis in FIG. 3B is set to be "upward". Therefore, the face direction operation determinator 211 is configured to determine whether or not the absolute value of the change amount of the face direction in the vertical direction per unit time exceeds the second threshold value "twice", as in the aforementioned face direction operation determinator 210.

The "second predetermined amount" may be one of values for determining whether or not there is the face direction operation in the vertical direction, and may be set as a fixed value in advance or as a variable value corresponding to some physical quantity or parameter. The "second predetermined amount" may be set as a value that allows the face direction operation and the change in the face direction caused by the driver's action of looking aside or the like to be appropriately distinguished, for example, on the basis of a distribution of a plurality of measurement points that indicate a difference between the change in the face direction in the vertical direction and the change in the line of sight in the vertical direction when the face direction operation is intended, and a distribution of a plurality of measurement points that indicate a difference between the change in the face direction in the vertical direction and the change in the line of sight in the vertical direction when the face direction changes due to the driver's action of looking aside or the like, wherein the distributions are obtained by experiments, experiences, or simulations.

The "second predetermined threshold value" may be one of values for determining whether or not there is the face direction operation in the vertical direction, and may be set as a fixed value in advance or as a variable value corresponding to some physical quantity or parameter. The "second predetermined threshold value" may be set as a lower limit value of a distribution range, for example, on the basis of a distribution of a plurality of measurement points that indicate the change amount of the face direction in the vertical direction per unit time when the face direction operation is intended, wherein the distribution is obtained by experiments, experiences, or simulations. The second threshold value is typically less than the first threshold value, which has been found by studies of the present inventors.

(3) Operation Intention Estimation

The rotation direction detector 212 is configured to detect the rotation of the driver's face and a rotation direction, on the basis of the determination results obtained by the face direction operation determinators 210 and 211. Specifically, if the face direction indicated by the determination results obtained by the face direction operation determinators 210 and 211 changes continuously, for example, in order of "downward", "leftward", "upward", and "rightward", then, the rotation direction detector 212 is configured to determine that the driver's face rotates clockwise. In other words, the rotation direction detector 212 is configured to determine that the driver's face rotates, if the face direction changes continuously in predetermined order.

On the other hand, the rotation direction detector 212 is configured to determine that the driver's face does not rotate (i) if the face direction indicated by the determination results obtained by the face direction operation determinators 210 and 211 changes irregularly, or (ii) if the change in the face direction is not indicated within a second predetermined period after the change in the face direction at a time point is indicated by the determination results obtained by the face direction operation determinators 210 and 211, i.e., if it is determined by both the face direction operation determinators 210 and 211 that there is no face direction operation.

The device control detector 213 is configured to estimate an operation intention of the driver of the vehicle 1 on the basis of the determination results obtained by the face direction operation determinators 210 and 211 and a detection result obtained by the rotation direction detector 212. Specifically, the device control detector 213 is configured to estimate the operation intention of the driver of the vehicle 1 by specifying an operation target device and an operation content from the determination results obtained by the face direction operation determinators 210 and 211 and the detection result obtained by the rotation direction detector 212, with reference to a table (refer to FIG. 4) for defining a relation among the face direction, the target device, and the operation, which is stored in advance in a memory or the like of the device control detector 213.

In FIG. 4, "Horizontal direction determination", "Vertical direction determination", and "Rotation" in FIG. 4 respectively correspond to the determination result obtained by the face direction operation determinator 210, the determination result obtained by the face direction operation determinator 211, and the detection result obtained by the rotation direction detector 212.

The device control detector 213 is configured to transmit a signal indicating the operation content to the operation target device in order to realize the operation input indicated by the estimated operation intention, on condition that a change amount of the steering angle indicated by an output from the steering sensor 30 is relatively small. As a result, on the operation target device, an operation corresponding to the estimated operation intention may be performed. In this case, the device control detector 213 may control a human machine interface (HMI) or the like, so that the driver is notified that the operation input is accepted, for example, by audio or the like.

On the other hand, if the change amount of the steering angle indicated by the output from the steering sensor 30 is relatively large, the device control detector 213 may not accept the face direction operation, even when the operation intention of the driver is estimated. In other words, if the driver of the vehicle 1 steers the steering wheel relatively significantly, the operation input by the face direction operation cannot be performed.

Technical Effect

On the operation input apparatus 100, it is determined whether or not there is the face direction operation, in view of a difference in the relation of the face direction and the line-of-sight direction between when the driver performs the face direction operation that is intended for the operation input and when the face direction changes due to the driver's action of looking aside or the like. On the operation input apparatus 100, it is determined whether or not there is the face direction operation, while further paying attention to the fact that the face direction is always returned when the face direction is changed as the face direction operation.

Specifically, the face direction operation determinator 210 is configured to determine that the face direction operation in the horizontal direction is performed, on condition that the change in the face direction in the horizontal direction is greater than the change in the line of sight in the horizontal direction by the amount that is greater than or equal to the first predetermined amount, and on condition that the absolute value of the change amount of the face direction in the horizontal direction per unit time exceeds the first threshold value twice within the first predetermined period. The face direction operation determinator 211 is configured to determine that the face direction operation in the vertical direction is performed, on condition that the change in the face direction in the vertical direction is greater than the change in the line of sight in the vertical direction by the amount that is greater than or equal to the second predetermined amount, and on condition that the absolute value of the change amount of the face direction in the vertical direction per unit time exceeds the second threshold value twice within the first predetermined period.

According to the operation input apparatus 100, the driver does not need to look away from the point to look at during driving, for the operation input, and the gesture made by the hand is not required. In addition, as described above, the face direction operation determination is performed on the basis of (i) the difference in the relation of the face direction and the line-of-sight direction between when the driver performs the face direction operation that is intended for the operation input and when the face direction changes due to the driver's action of looking aside or the like and (ii) the fact that the face direction is always returned when the face direction is changed as the face direction operation. It is thus possible to prevent an erroneous operation caused by erroneous determination.

If the steering angle is relatively large, i.e., if the driver steers the steering wheel relatively significantly, the face direction of the driver changes relatively significantly (even without the driver's intention) in many cases. In the embodiment, the device control detector 213 is configured not to accept the face direction operation if the change amount of the steering angle is relatively large, which prevents an erroneous operation input from being accepted due to the change in the face direction that is not intended by the driver. In addition, such a configuration allows the driver to focus on the steering of the steering wheel.

Modified Example

In the aforementioned embodiment, it is determined whether or not there is the face direction operation on the basis of the change amount of the face direction; however, it may be determined whether or not there is the face direction operation on the basis of a speed of the face direction.

Figure 5:
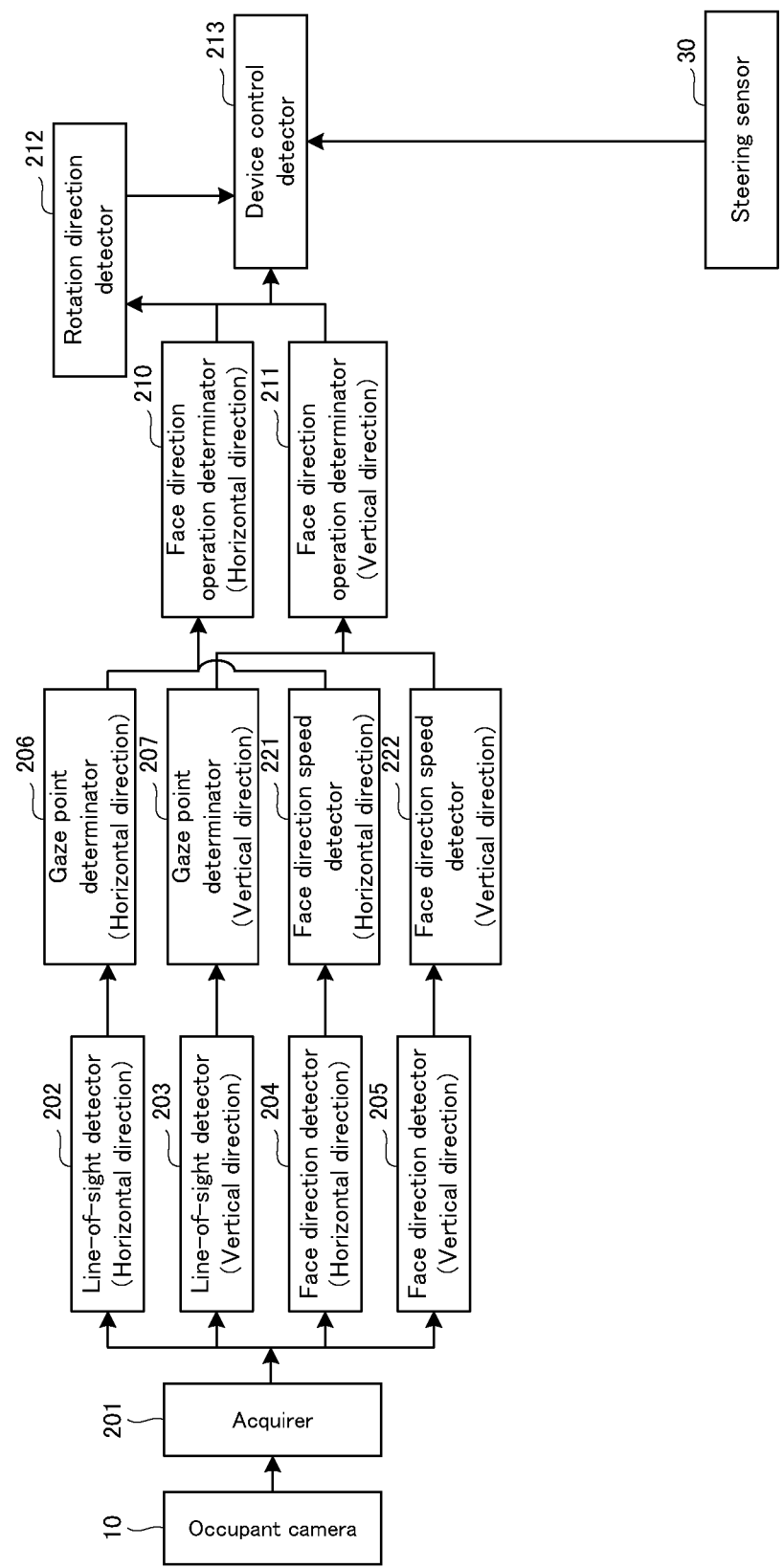
FIG. 5 is a block diagram illustrating a configuration of a processor according to a modified example.

Operations of a processor according to a modified example will be specifically explained with reference to FIG. 5 and FIG. 6. FIG. 5 is a block diagram illustrating a configuration of the processor according to the modified example. In FIG. 5, a processor 20' is provided with face direction speed detectors 221 and 222, instead of the face direction change amount detectors 208 and 209.

The face direction speed detector 221 is configured to detect a change speed of the face direction in the horizontal direction, on the basis of the detection result obtained by the face direction detector 204. In the same manner, the face direction speed detector 222 is configured to detect a change speed of the face direction in the vertical direction, on the basis of the detection result obtained by the face direction detector 205.

Figure 6:
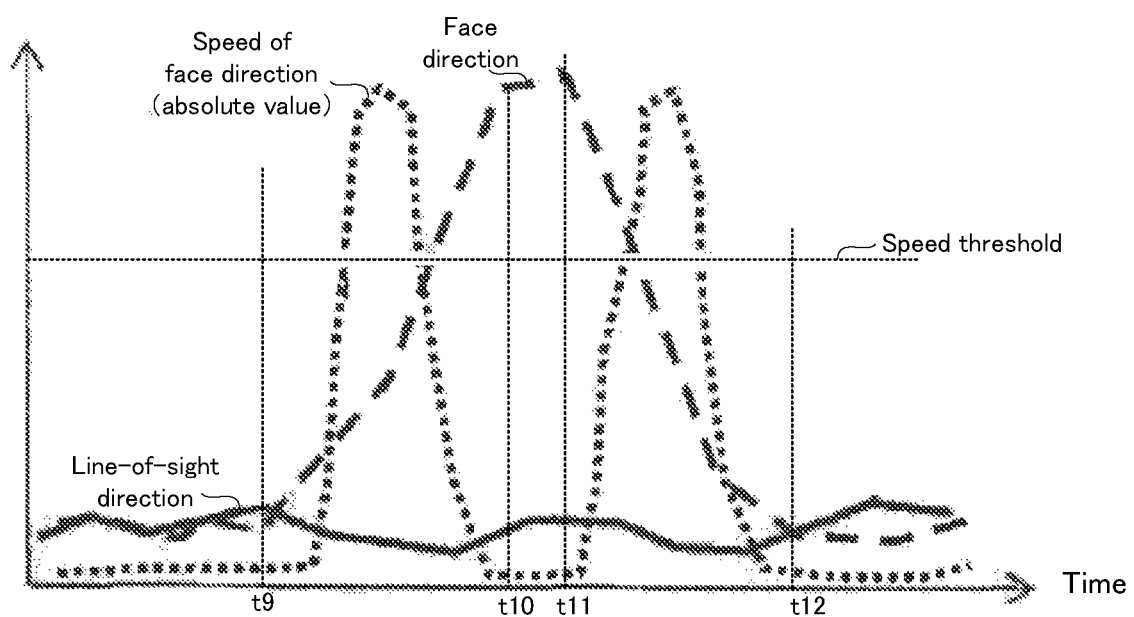
FIG. 6 is a diagram illustrating an example of a time change in the face direction, the line-of-sight direction, and a speed of the face direction.

By the way, in performing the face direction operation that is intended for the operation input, as illustrated in FIG. 6, when the face direction (refer to a dashed line in FIG. 6) changes in one direction (refer to time points t9 to t10), a peak of an absolute value of the speed of the face direction (refer to a dotted line in 6) appears. Moreover, a peak of the absolute value of the speed of the face direction also appears when the face direction changes in a direction opposite to the one direction (refer to time points t11 to t12). On the other hand, there is a relatively small change in the line-of-sight direction (refer to a solid line in FIG. 6).

The face direction operation determinator 210 is configured to determine that the face direction operation in the horizontal direction is performed, on condition that an absolute value of the change speed of the face direction in the horizontal direction based on a detection result obtained by the face direction speed detector 221 is greater than a speed threshold value (refer to FIG. 6), and on condition that the change in the line of sight in the horizontal direction based on the determination result obtained by the gaze point determinator 206 is less than a change amount threshold value (refer to FIG. 6). In the same manner, the face direction operation determinator 211 is configured to determine that the face direction operation in the vertical direction is performed, on condition that an absolute value of the change speed of the face direction in the vertical direction based on a detection result obtained by the face direction speed detector 222 is greater than the speed threshold value, and on condition that the change in the line of sight in the vertical direction based on the determination result obtained by the gaze point determinator 207 is less than the change amount threshold value.

The face direction operation determinator 210 may be configured to determine that the face direction operation in the horizontal direction is performed, on condition that the absolute value of the change speed of the face direction in the horizontal direction exceeds the speed threshold value twice within the predetermined period, and on condition that the change in the line of sight in the horizontal direction is less than the change amount threshold value. In the same manner, the face direction operation determinator 211 may be configured to determine that the face direction operation in the vertical direction is performed, on condition that the absolute value of the change speed of the face direction in the vertical direction exceeds the speed threshold value twice within the predetermined period, and on condition that the change in the line of sight in the vertical direction is less than the change amount threshold value.

The "speed threshold value" may be one of values for determining whether or not there is the face direction operation, and may be set as a fixed value in advance or as a variable value corresponding to some physical quantity or parameter. The "speed threshold value" may be set as a lower limit value of a distribution range, for example, on the basis of a distribution of a plurality of measurement points that indicate the change speed of the face direction when the face direction operation is intended, wherein the distribution is obtained by experiments, experiences, or simulations. The "speed threshold value" may be different between in the horizontal direction and in the vertical direction.

The "change amount threshold value" may be one of values for determining whether or not there is the face direction operation, and may be set as a fixed value in advance or as a variable value corresponding to some physical quantity or parameter. The "change amount threshold value" may be set as a value that allows the face direction operation and the change in the face direction caused by the driver's action of looking aside or the like to be appropriately distinguished, for example, on the basis of a distribution of a plurality of measurement points that indicate the change in the line of sight when the face direction operation is intended, and a distribution of a plurality of measurement points that indicate the change in the line of sight when the face direction changes due to the driver's action of looking aside or the like, wherein the distributions are obtained by experiments, experiences, or simulations. The "change amount threshold value" may be different between in the horizontal direction and in the vertical direction.

Another Modified Example

For example, as the first threshold value (refer to FIG. 3A), a plurality of threshold values with different values may be set. For example, in the case of a face direction operation corresponding to an operation input associated with the volume of sound and temperature, a fluctuation width (or an increase/decrease width) for the volume of sound and temperature may be changed by a threshold value exceeded by the absolute value of the change amount of the face direction. Such a configuration makes it possible to reduce the number of times of performing the face direction operation, which is extremely useful in practice.

In the aforementioned embodiment, the face direction and the line of sight are separated to those in the horizontal direction and those in the vertical direction; however, they may not be separated to those in the horizontal direction and those in the vertical direction.

The operation intention of the driver may be estimated by combining the face direction operation and, for example, audio input Various aspects of embodiments of the present disclosure derived from the embodiment and the modified examples explained above will be explained hereinafter.

An operating apparatus according to an aspect of embodiments of the present disclosure is provided with: a line-of-sight detector configured to detect a line of sight of an occupant of a vehicle; a face direction detector configured to detect a face direction of the occupant; and an estimator configured to estimate an operation intention intended by the face direction on the basis of the detected face direction, on condition that a change in the detected face direction is greater than a change in the detected line of sight by an amount that is greater than or equal to a predetermined amount. In the aforementioned embodiment, the line-of-sight direction detectors 202 and 203 and the gaze point determinators 206 and 207 correspond to an example of the line-of-sight detector. The face direction detectors 204 and 205 and the face direction change amount detectors 208 and 209 correspond to an example of the face direction detector. The device control detector 213 corresponds to an example of the estimator.

Here, when the face direction changes with the intention of the operation, there is a relatively large difference between a direction of the line of sight of the occupant (e.g., a driver) and the face direction, in a relatively short period. At the same time, there is a relatively small change in the direction of the line-of-sight of the occupant, whereas there is a relatively large change in the face direction. On the other hand, when the face direction changes due to an action of looking aside or the like, there is a relatively small difference between the direction of the line of sight of the occupant and the face direction. Therefore, if the change in the detected face direction is greater than the change in the detected line of sight by the amount that is greater than or equal to the predetermined amount, it can be said that the change in the detected face direction is intended for the operation.

According to the operating apparatus, it is possible to distinguish between the change in the face direction that is intended for the operation and the action of looking aside or the like by comparing the change in the face direction with the change in the line of sight. It is thus possible to prevent the action of looking aside or the like from being erroneously recognized to be the change in the face direction that is intended for the operation. As a result, according to the operating apparatus, it is possible to prevent an erroneous operation. Moreover, on the operating apparatus, the operation intention of the occupant is estimated from the change in the face direction. In other words, according to the operating apparatus, the gesture made by the hand is not required.

In an aspect of the operating apparatus, the estimator is configured to estimate the operation intention intended by the face direction (i) if the change in the detected face direction is greater than the change in the detected line of sight by the amount that is greater than or equal to the predetermined amount, and (ii) when the face direction changes in one direction and then changes in a return direction, if a change amount of the detected face direction per unit time when the face direction changes in the one direction is greater than a change amount threshold value and if a change amount of the detected face direction per unit time when the face direction changes in the return direction is greater than the change amount threshold value. In the aforementioned embodiment, the first and second threshold values correspond to an example of the change amount threshold value.

Here, when the face direction changes in one direction with the intention of the operation, the face direction is always returned. Thus, the change amount of the face direction per unit time becomes relatively large twice, i.e., when the face direction changes in the one direction and when the face direction is returned. In other words, such a condition that the change amount of the face direction per unit time exceeds the change amount threshold value twice is an important clue for knowing the change in the face direction that is intended for the operation. Therefore, according to this aspect, it is possible to prevent the erroneous operation.

In another aspect of the operating apparatus, the line-of-sight detector is configured to obtain a change in the line of sight in a horizontal direction and a change in the line of sight in a vertical direction, from the detected line of sight, the face direction detector is configured to obtain a change in the face direction in the horizontal direction and a change in the face direction in the vertical direction, from the detected face direction, and the estimator is configured to estimate the operation intention intended by the face direction, on condition that at least one of a condition (i) and a condition (ii) is satisfied, wherein the condition (i) is that the change in the face direction in the horizontal direction is greater than the change in the line of sight in the horizontal direction by an amount that is equal to or greater than a first predetermined amount, which is the predetermined amount corresponding to the horizontal direction, and the condition (ii) is that the change in the face direction in the vertical direction is greater than the change in the line of sight in the vertical direction by an amount that is greater than or equal to a second predetermined amount, which is the predetermined amount corresponding to the vertical direction.

Suppose that, for example, an actual change direction of the face direction is a slightly right obliquely downward direction, when the occupant intends to perform an operation corresponding to a "rightward change in the face direction" and changes the face direction to the right. In such a configuration that the changes in the face direction and the line of sight in the horizontal direction are not treated separately from the changes in the face direction and the line of sight in the vertical direction, there is a possibility that the change in the face direction described above is not recognized to be the "rightward change in the face direction", but is erroneously recognized to be a "change in the right obliquely downward direction". According to this aspect, however, the changes in the face direction and the line of sight in the horizontal direction are treated separately from the changes in the face direction and the line of sight in the vertical direction, which makes it possible to prevent the erroneous recognition as described above.

An operating apparatus according to another aspect of embodiments of the present disclosure is provided with: a line-of-sight detector configured to detect a line of sight of an occupant of a vehicle; a face direction detector configured to detect a face direction of the occupant; and an estimator configured to estimate an operation intention intended by the face direction on the basis of the detected face direction, on condition that a change speed of the face direction when the face direction changes in one direction, which is based on the detected face direction, is greater than a predetermined speed, and on condition that a change in the detected line of sight is less than a predetermined change amount. In the aforementioned embodiment, the speed threshold value corresponds to an example of the predetermined speed, and the change amount threshold value corresponds to the predetermined change amount.

Here, if the face direction changes with the intention of the operation, the direction of the line of sight of the occupant rarely changes, whereas the face direction relatively significantly changes. The change in the face direction that is intended for the operation is performed in a relatively short time, and the change speed of the face direction becomes relatively large. Therefore, if the change speed of the face direction is greater than the predetermined speed and if the change in the line of sight is less than the predetermined change amount, it can be said that the change in the detected face direction is intended for the operation.

According to the operating apparatus, the change speed of the face direction and the change in the face direction are considered, and it is thus possible to distinguish between the change in the face direction that is intended for the operation and the action of looking aside or the like. This is because the line of sight changes relatively significantly when the face direction changes due to the action of looking aside or the like. It is thus possible to prevent the action of looking aside or the like from being erroneously recognized to be the change in the face direction that is intended for the operation. As a result, according to the operating apparatus, it is possible to prevent the erroneous operation. Moreover, according to the operating apparatus, the gesture made by the hand is not required.

In an aspect of the operating apparatus, the estimator is configured to estimate the operation intention intended by the face direction (i) if the change in the detected line of sight is less than the predetermined change amount, and (ii) when the face direction changes in one direction and then changes in a return direction, if a change speed of the detected face direction when the face direction changes in the one direction is greater than the predetermined speed and if a change speed of the detected face direction when the face direction changes in the return direction is greater than the predetermined speed.

Here, when the face direction changes in one direction with the intention of the operation, the face direction is always returned. Thus, the change speed of the face direction becomes relatively large twice, i.e., when the face direction changes in the one direction and when the face direction is returned. In other words, such a condition that the change speed of the face direction exceeds the predetermined speed twice is an important clue for knowing the change in the face direction that is intended for the operation. Therefore, according to this aspect, it is possible to prevent the erroneous operation.

In another aspect of the operating apparatus, the line-of-sight detector is configured to obtain a change in the line of sight in a horizontal direction and a change in the line of sight in a vertical direction, from the detected line of sight, the face direction detector is configured to obtain a change in the face direction in the horizontal direction and a change in the face direction in the vertical direction, from the detected face direction, and the estimator is configured to estimate the operation intention intended by the face direction, on condition that at least one of a condition (i) and a condition (ii) is satisfied, wherein the condition (i) is that a change speed of the face direction in the horizontal direction is greater than a first predetermined speed, which is the predetermined speed corresponding to the horizontal direction, and that the change in the line of sight in the horizontal direction is less than a first predetermined change amount, which is the predetermined change amount corresponding to the horizontal direction, and the condition (ii) is that a change speed of the face direction in the vertical direction is greater than a second predetermined speed, which is the predetermined speed corresponding to the vertical direction, and that the change in the line of sight in the vertical direction is less than a second predetermined change amount, which is the predetermined change amount corresponding to the vertical direction.

Suppose that, for example, an actual change direction of the face direction is a slightly right obliquely downward direction, when the occupant intends to perform an operation corresponding to a "rightward change in the face direction" and changes the face direction to the right. In such a configuration that the changes in the face direction and the line of sight in the horizontal direction are not treated separately from the changes in the face direction and the line of sight in the vertical direction, there is a possibility that the change in the face direction described above is not recognized to be the "rightward change in the face direction", but is erroneously recognized to be a "change in the right obliquely downward direction". According to this aspect, however, the changes in the face direction and the line of sight in the horizontal direction are treated separately from the changes in the face direction and the line of sight in the vertical direction, which makes it possible to prevent the erroneous recognition as described above.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. An operating apparatus comprising:
   a line-of-sight detector configured to detect a line of sight of an occupant of a vehicle;
   a face direction detector configured to detect a face direction of the occupant; and
   an estimator configured to estimate an operation intention intended by the face direction on the basis of the detected face direction, on condition that a change in the detected face direction is greater than a change in the detected line of sight by an amount that is greater than or equal to a predetermined amount,
   wherein the estimator is configured to estimate the operation intention intended by the face direction (i) if the change in the detected face direction is greater than the change in the detected line of sight by the amount that is greater than or equal to the predetermined amount, and (ii) when the face direction changes in one direction and then changes in a return direction, if a change amount of the detected face direction per unit time when the face direction changes in the one direction is greater than a change amount threshold value and if a change amount of the detected face direction per unit time when the face direction changes in the return direction is greater than the change amount threshold value.

2. The operating apparatus according to claim 1, wherein the line-of-sight detector is configured to obtain a change in the line of sight in a horizontal direction and a change in the line of sight in a vertical direction, from the detected line of sight,
   the face direction detector is configured to obtain a change in the face direction in the horizontal direction and a change in the face direction in the vertical direction, from the detected face direction, and
   the estimator is configured to estimate the operation intention intended by the face direction, on condition that at least one of a condition (i) and a condition (ii) is satisfied, wherein the condition (i) is that the change in the face direction in the horizontal direction is greater than the change in the line of sight in the horizontal direction by an amount that is equal to or greater than a first predetermined amount, which is the predetermined amount corresponding to the horizontal direction, and the condition (ii) is that the change in the face direction in the vertical direction is greater than the change in the line of sight in the vertical direction by an amount that is greater than or equal to a second predetermined amount, which is the predetermined amount corresponding to the vertical direction.

3. The operating apparatus according to claim 1, wherein the operating apparatus further comprises a rotation detector configured to detect a rotation of the face of the occupant on the basis of the detected face direction,
   the face direction detector is configured to obtain a change in the face direction in the horizontal direction and a change in the face direction in the vertical direction, from the detected face direction, and
   the estimator is configured to estimate the operation intention intended by the face direction on the basis of combination of the obtained change in the face direction in the horizontal direction, the obtained change in the face direction in the vertical direction and the detected rotation.

4. The operating apparatus according to claim 1, wherein the operating apparatus further comprises a steering sensor,
   the estimator is configured to accept a face direction operation indicated by the estimated operation intention intended by the face direction, on condition that a change amount of a steering angle indicated by an output from the steering sensor is relatively small, and
   the estimator is configured not to accept the face direction operation, on condition that the change amount of the steering angle is relatively large.

5. An operating apparatus comprising:
   a line-of-sight detector configured to detect a line of sight of an occupant of a vehicle;
   a face direction detector configured to detect a face direction of the occupant; and
   an estimator configured to estimate an operation intention intended by the face direction on the basis of the detected face direction, on condition that a change speed of the face direction when the face direction changes in one direction, which is based on the detected face direction, is greater than a predetermined speed, and on condition that a change in the detected line of sight is less than a predetermined change amount, wherein the estimator is configured to estimate the operation intention intended by the face direction (i) if the change in the detected line of sight is less than the predetermined change amount, and (ii) when the face direction changes in one direction and then changes in a return direction, if a change speed of the detected face direction when the face direction changes in the one direction is greater than the predetermined speed and if a change speed of the detected face direction when the face direction changes in the return direction is greater than the predetermined speed.

6. The operating apparatus according to claim 5, wherein the line-of-sight detector is configured to obtain a change in the line of sight in a horizontal direction and a change in the line of sight in a vertical direction, from the detected line of sight, the face direction detector is configured to obtain a change in the face direction in the horizontal direction and a change in the face direction in the vertical direction, from the detected face direction, and the estimator is configured to estimate the operation intention intended by the face direction, on condition that at least one of a condition (i) and a condition (ii) is satisfied, wherein the condition (i) is that a change speed of the face direction in the horizontal direction is greater than a first predetermined speed, which is the predetermined speed corresponding to the horizontal direction, and that the change in the line of sight in the horizontal direction is less than a first predetermined change amount, which is the predetermined change amount corresponding to the horizontal direction, and the condition (ii) is that a change speed of the face direction in the vertical direction is greater than a second predetermined speed, which is the predetermined speed corresponding to the vertical direction, and that the change in the line of sight in the vertical direction is less than a second predetermined change amount, which is the predetermined change amount corresponding to the vertical direction.

7. The operating apparatus according to claim 5, wherein the operating apparatus further comprises a rotation detector configured to detect a rotation of the face of the occupant on the basis of the detected face direction, the face direction detector is configured to obtain a change in the face direction in the horizontal direction and a change in the face direction in the vertical direction, from the detected face direction, and the estimator is configured to estimate the operation intention intended by the face direction on the basis of combination of the obtained change in the face direction in the horizontal direction, the obtained change in the face direction in the vertical direction and the detected rotation.

8. The operating apparatus according to claim 5, wherein the operating apparatus further comprises a steering sensor, the estimator is configured to accept a face direction operation indicated by the estimated operation intention intended by the face direction, on condition that a change amount of a steering angle indicated by an output from the steering sensor is relatively small, and the estimator is configured not to accept the face direction operation, on condition that the change amount of the steering angle is relatively large.

* * * * *